Aug. 1, 1967
E. F. RUDD
3,333,499
SELF-PENETRATING WEDGE PIN
Filed Aug. 24, 1965
2 Sheets-Sheet 1
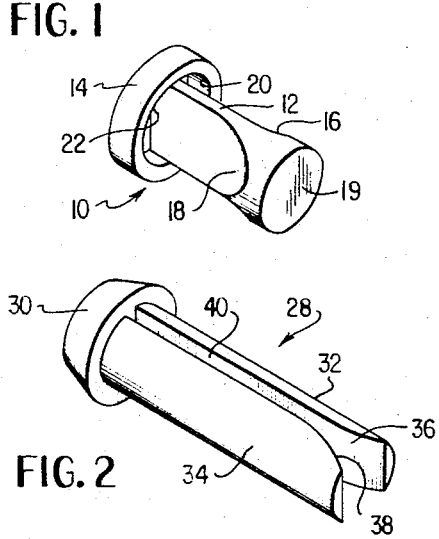
FIG. 1
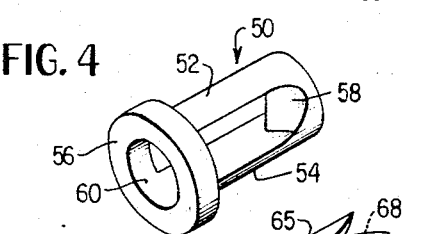
FIG. 2
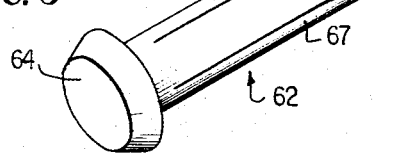
FIG. 4
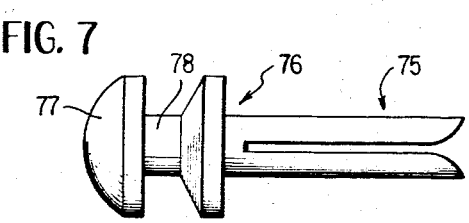
FIG. 5
FIG. 7
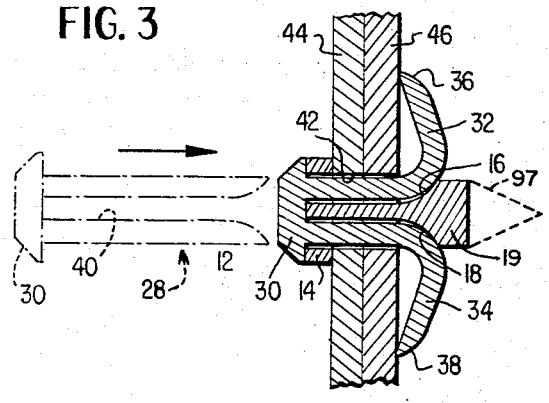
FIG. 3
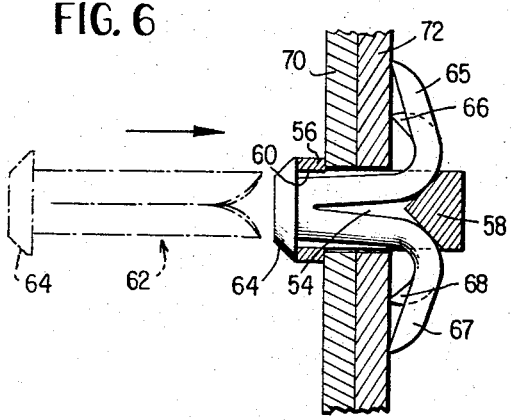
FIG. 6
FIG. 8
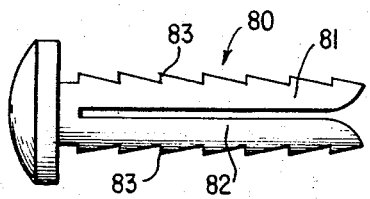
FIG. 9
INVENTOR
EDWARD F. RUDD
BY Shanley & O'Neil
ATTORNEY Aug. 1, 1967   E. F. RUDD   3,333,499
SELF-PENETRATING WEDGE PIN
Filed Aug. 24, 1965   2 Sheets-Sheet 2

INVENTOR
EDWARD F. RUDD

BY Shanley & O'Neil
ATTORNEYS.

United States Patent Office 3,333,499
Patented Aug. 1, 1967

3,333,499
SELF-PENETRATING WEDGE PIN
Edward F. Rudd, Leivasy, W. Va. 26676
Filed Aug. 24, 1965, Ser. No. 482,057
1 Claim. (Cl. 85—38)

This invention is concerned generally with fastening devices and, in one of its more specific aspects, with self-locking fastening devices adapted to be driven into locked position in limited access locations.

The present invention performs all the functions of bolt-and-nut combinations, rivets, and the like, in securing items together or establishing an anchoring point on a surface, yet the fastening device of the invention can be quickly installed without threading, turning, or buckling up, and with access to only one working surface.

An object of the invention is the provision of a two-piece self-locking fastening assembly adapted to be driven into locked position from one of its longitudinal ends without need of access to its remaining longitudinal end and which exerts holding force from both its longitudinal ends.

No special tools are required for installation of the fastening assembly of the present invention. The assembly can be driven into place manually or with power tools. It can be installed quickly and its self-locking feature makes it especially adaptable for production line assembly. Installation can be either permanent or removable. No special skills are required for use and manufacture is uncomplicated and economical.

Fastening devices which exert a holding force from both their longitudinal ends have been limited in the past to items which require access from both longitudinal ends to complete assembly or items which are relatively complex in manufacture and use, such as the well known molly bolt. The present invention departs from such teachings of the prior art in providing a fastening assembly which can be readily hammered into place much like a common nail, yet applies locking force from both its longitudinal ends.

Figure 10:
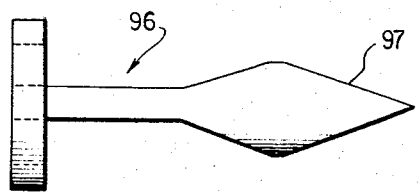
Figure 11:
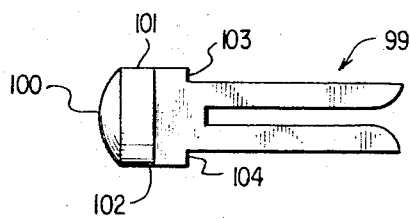
Figure 12:
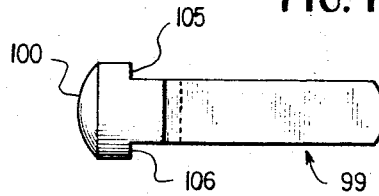
Figure 13:
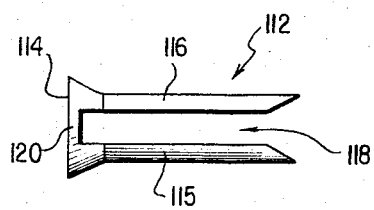
Figure 14:
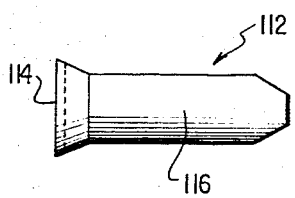
Figure 15:
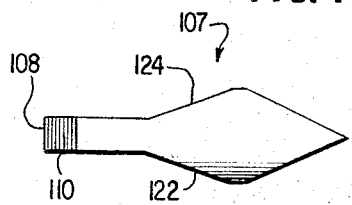
Figure 16:
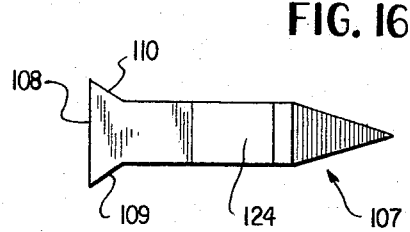
Figure 17:

Additional advantages of and uses for the present invention are brought out in the following detailed description and the accompanying drawings, in which:

FIGURE 1 is a perspective view of anchoring means included in the invention,

FIGURE 2 is a perspective view of locking pin means forming part of the present invention, FIGURE 3 is a perspective view of the structure of FIGURES 1 and 2, partially cut away, showing various positions of the structure in use, FIGURE 4 is a perspective view of other anchoring means included in the invention, FIGURE 5 is a perspective view of other locking pin means included in the invention, FIGURE 6 is a perspective view of the structure of FIGURES 4 and 5, partially cut away, showing various positions of the structure in use, FIGURE 7 shows a removable locking pin means included in the invention, FIGURE 8 shows a permanent locking pin means included in the present invention, FIGURE 9 shows another embodiment of the locking pin means included in the present invention, FIGURE 10 is a side view of anchoring means included in the invention, FIGURE 11 is a side view of a removable type locking pin means included in the invention, FIGURE 12 is another side view of the locking pin means of FIGURE 11, FIGURE 13 is a side view of a flush mounted type locking pin means included in the invention, FIGURE 14 is another side view of the locking pin means of FIGURE 13, FIGURE 15 is a side view of a flush mounted type anchoring means included in the invention, FIGURE 16 is another side view of the anchoring means of FIGURE 15, and FIGURE 17 is a side view of adapter means included in the invention.

FIGURE 1 shows anchoring means 10 having an elongated shank 12 with flange 14 at one longitudinal end of the shank and wedge surfaces 16, 18, tapering outwardly toward the opposite longitudinal end 19 of shank 12. The flange 14 defines apertures 20 and 22 between its inner surface and shank 12.

FIGURE 2 shows locking pin means 28 including head means 30 at one longitudinal end and leg means including leg 32 and leg 34 extending longitudinally from the head means 30. Legs 32 and 34 include beveled surfaces 36 and 38 respectively. The legs are separated by a longitudinal slot 40.

FIGURE 3 shows the anchoring means 10 and locking pin means 28 in various stages of operation. The anchoring means 10 is inserted into aperture 42 in surfaces 44 and 46 to be held together. It is to be understood that when suitable materials are used and depending on the surfaces to be locked together, anchoring means 10 can be of pointed configuration at its sub-surface end 19 and can be driven into place without need of an aperture.

After the anchoring means is positioned the locking pin means 28 is aligned with its longitudinal axis coextensive with the longitudinal axis of the anchoring means 10 and the leg means inserted into apertured flange 14. Leg 32 is inserted in aperture 20 and leg 34 is inserted in aperture 22. The locking pin means 28 is then driven longitudinally inwardly and beveled surfaces 36 and 38 come into contact with wedge surfaces 16 and 18 respectively. This contact bends the legs radially outwardly and a locking force is exerted on both the subsurface and surface ends of the materials to be held together. The subsurface locking force is exerted against surface 46 by the legs 32, 34 where they bend outwardly and the locking pin can be driven inwardly sufficiently that the ends of legs 32 and 34 contact surface 46 as well.

FIGURE 4 shows an anchoring means 50 having longitudinal shank means including shank members 52 and 54. The shank means of this embodiment extend between apertured flange means 56 at one longitudinal end of anchoring means 50 and pin-spreading wedge surface means 58 at the opposite longitudinal end. Flange head 56 defines aperture 60.

FIGURE 5 shows a locking pin means 62 which may be used with the anchoring means 50 of FIGURE 4. This locking pin means includes head 64 and longitudinally extending legs 65, 66, 67 and 68. Cross-sectional size and configuration of these legs is such that they fit snugly within the aperture 60 of anchoring means 50.

FIGURE 6 shows the self-locking assembly of FIGURES 4 and 5 in various stages of operation. The anchoring means 50 is inserted or driven into surfaces 70 and 72 to be secured. The locking pin means 62 is inserted in the aperture 60 and moves longitudinally inwardly such that legs 65, 66, 67 and 68 contact wedge surface means 58 and are spread radially outwardly. When spread outwardly, a locking force is exerted on both the surface and subsurface of the materials to be secured together.

It will be noted that the shank means 12 extends along the longitudinal axis of the anchoring means 10 and that the shank members 52 and 54 of anchoring means 50 extend along its periphery. It is to be understood that a shank means for connecting the flange and wedge surface ends of an anchoring means of the present invention can take other forms and be otherwise located.

FIGURE 7 shows an embodiment of the locking pin means which provides a securing point for further use, as well as a type of pin means having a readily accessible head for removing the pin. Locking pin means 75 of FIGURE 7 includes a first head 76 and a second head 77 spaced from the first head 76 by shank 78. Head 77 and shank 78 can be used for attaching objects to a surface after the locking pin means 75 is in position or can be used for withdrawal of locking pin means 75.

FIGURE 8 shows locking pin means 80 in which the legs 81 and 82 include serrations such as 83 which lock on a flange of the anchoring means when driven into position and establish a permanent assembly.

FIGURE 9 shows another embodiment of locking pin means of the flush head type in which the head means 92 has substantially the same configuration as the remainder of the locking pin means 94.

FIGURE 10 shows anchoring means 96 similar to the embodiment shown in FIGURE 1 with the exception that end 97 has a pointed configuration and may be driven into place without need of an aperture. The anchoring means with pointed end configuration 97 is shown in assembled form by the dotted lines in FIGURE 3.

Locking pin means 99 of FIGURES 11 and 12 is a removable pin means with a single-head which can be substituted in many applications for the double-head pin means shown in FIGURE 7. Pin means 99 is shown from two views separated by an angle of 90°. Head means 100 is longitudinally extended with solid portions 101 and 102 extending throughout the full longitudinal length of the head means. Surfaces 103 and 104 determine the depth to which locking pin means 99 can be driven. The remainder of the head means is open for a portion of its longitudinal length defining openings 105, 106 on either side of the locking head into which claws of a hammer, or other tool used for removing a locking pin, can be inserted.

The principles of the invention are applicable without use of a flange at the outer surface of an anchoring means. This permits a locking means and anchoring means to be mounted substantially flush with the outer surface to which applied. Such an embodiment is dipicted in FIGURES 13 through 16. FIGURES 15 and 16 are side views, separated by 90° of anchoring means 106. Anchoring means 106 has no apertures at its head 108. Side surfaces 109 and 110 of the head means are tapered and conform to the shape of the hole into which the anchoring means 106 is inserted or driven. These side surfaces 109 and 110 function as earlier described apertured flanges for supporting the anchoring means.

FIGURES 13 and 14 are side views, separated by 90°, of locking pin means 112 which includes head means 114 and legs 115, 116. Longitudinal slot 118 separates legs 115 and 116 and a relatively thin section of metal 120 remains at the head end of the longitudinal slot 118.

Longitudinal slot 118 fits over the narrow section of head 108 of anchoring means 106. Legs 115 and 116 are spread by wedge surfaces 122 and 124, respectively, of anchoring means 106 and provide subsurface holding force. Head side surfaces 109 and 110 provide surface holding force.

FIGURE 17 shows an adapter 124 which may be used with an anchoring means of the type shown in FIGURE 4. Adapter 125 is inserted in aperture 60 of anchoring means 50 and acts to shorten the effective length of shank 52.

Various embodiments of the invention have been set forth for purposes of adequate discloseure. It is to be understood however that various modifications in shape, relative size, and materials of these embodiments may be resorted to while utilizing the principles of the invention. Therefore the scope of the present invention is to be determined from the appended claim.

What is claimed is:

A two-piece, self-locking fastening assembly adapted to be driven from one of its longitudinal ends to form an opening for the assembly and interlock the assembly without need of access to the remaining longitudinal end of the assembly, with the interlocked assembly exerting holding force from both its longitudinal ends and intermediate its longitudinal ends, comprising in combination elongated anchoring means having a longitudinal axis, ring-shaped flange means at one longitudinal end, elongated shank means joined at one longitudinal end to the ring-shaped flange means and extending longitudinally along the longitudinal axis of the anchoring means and terminating at its opposite longitudinal end in a pointed configuration for forming an opening for the elongated anchoring means while being driven into place, said pointed configuration tapering from a penetrating tip to a portion of the shank means having a circular configuration defining the maximum transverse dimension of the shank means, and wedge surface means diverging radially outwardly from the elongated shank means intermediate the ring-shaped flange means and pointed configuration end of the elongated shank means, the ring-shaped flange means having a planar, ring-shaped flange surface defining a driving surface lying in a plane substantially perpendicular to the longitudinal axis of the elongated anchoring means, the ring-shaped flange surface having a diametral dimension substantially in excess of the opening formed by driving the elongated anchoring means into place, with the ring-shaped flange means defining aperture means located radially inwardly from the ring-shaped flange surface on either side of the elongated shank means and extending longitudinally along the elongated shank means toward the wedge surface means, and elongated locking pin means having a longitudinal axis, the locking pin means including an enlarged head means at one longitudinal end and leg means extending longitudinally from the head means toward the remaining longitudinal end of the elongated locking pin means, the leg means including at least two spaced elongated legs joined at one longitudinal end to the head means and extending independently along the longitudinal axis of the locking pin means, the cross-sectional dimensions of the leg means and the elongated anchoring means permitting the leg means to be inserted longitudinally into the aperture means defined by the ring-shaped flange means and to be driven inwardly along the elongated shank means toward the wedge surface means, with the wedge surface means causing the leg means to be spread radially outwardly so as to contact material being interlocked intermediate the longitudinal ends of the leg means, the inner surface of the leg means at the free ends thereof being beveled to facilitate spreading by the wedge surface means.

References Cited

UNITED STATES PATENTS

| 958,127 | 5/1910 | Hovrud | 85—26 |
| 1,433,206 | 10/1922 | Hojnowski | 85—26 |
| 1,561,518 | 11/1925 | Graham | 85—26 |
| 2,328,023 | 8/1943 | Lang | 85—38 |
| 2,409,180 | 10/1946 | Annett et al. | 85—38 |
| 3,113,753 | 5/1964 | Goodman et al. | 85—28 |

FOREIGN PATENTS 891,332  12/1943  France.

CARL W. TOMLIN, *Primary Examiner.*

R. S. BRITTS, *Assistant Examiner.*